United States Patent [19]
de Jong et al.

[11] Patent Number: 5,765,879
[45] Date of Patent: Jun. 16, 1998

[54] LOCKING ARRANGEMENT FOR A FLUID INSERTION CONNECTION

[75] Inventors: Leendert Willem C. de Jong; Willem Herman Masseling; Ben Kuiper, all of Oldenzaal; Aswin Leonard Koebrugge, Hengelo, all of Netherlands

[73] Assignee: Applied Power Inc., Butler, Wis.

[21] Appl. No.: 716,927

[22] Filed: Sep. 20, 1996

[30] Foreign Application Priority Data

Sep. 22, 1995 [NL] Netherlands ................ 1001273

[51] Int. Cl.$^6$ ............................................. F16L 41/00
[52] U.S. Cl. .................. 285/189; 285/361; 285/402; 285/396
[58] Field of Search ................................ 285/189, 377, 285/376, 402, 401, 361, 396, 362

[56] References Cited

U.S. PATENT DOCUMENTS

| | | | |
|---|---|---|---|
| 796,306 | 8/1905 | Exley | 285/361 |
| 3,649,052 | 3/1972 | Snyder, Jr. | 285/362 |
| 4,436,327 | 3/1984 | Schaefer | 285/364 |
| 4,513,998 | 4/1985 | Grossauer | 285/308 |
| 4,632,433 | 12/1986 | Kimura | 285/361 |
| 4,920,766 | 5/1990 | Yamamoto et al. | 285/377 |

FOREIGN PATENT DOCUMENTS

| | | |
|---|---|---|
| 0 046 223 A1 | 7/1981 | European Pat. Off. . |
| 0 073 892 A1 | 7/1982 | European Pat. Off. . |
| 0 363 283 A1 | 10/1989 | European Pat. Off. . |
| 28 49 133 A1 | 11/1978 | Germany . |

Primary Examiner—Eric K. Nicholson
Attorney, Agent, or Firm—Quarles & Brady

[57] ABSTRACT

Locking arrangement of a fluid insertion connection between a fluid line and a connection member, in particular between a hydraulic line and a hydraulic cylinder, the fluid line having an insertion part at one end and the connection member being provided with an insertion opening which is open at the circumferential surface of the connection member and receives the insertion part of the line. Furthermore, locking means are provided, which engage on an abutment surface of the insertion part of the fluid line in order to prevent the insertion part of the line from being pulled out of the insertion opening.

The locking means comprise a ring, which is positioned around the connection member at the position of the insertion opening and is movable with respect to the connection member. The ring has a slot extending between its inside and its outside, which slot comprises a first slot part, through which the insertion part of the fluid line fits when the first slot part of the ring is aligned with respect to the insertion opening, and a second slot part, which is connected to the first slot part and is narrower than the first slot part, so that when the second slot part of the ring is aligned with respect to the insertion opening, part of the ring engages on the abutment surface of the insertion part which has been inserted into the insertion opening, as a result of which the insertion part is locked so that it cannot be pulled out.

10 Claims, 3 Drawing Sheets

5,765,879

1

LOCKING ARRANGEMENT FOR A FLUID INSERTION CONNECTION

BACKGROUND OF THE INVENTION

The present invention relates to a locking arrangement for a fluid insertion connection.

A locking arrangement of this kind is disclosed by German Patent 38 17 472. In this known locking arrangement, the locking means comprise a U-shaped metal clamp, which is pushed into a slot which is formed in the connection member parallel to the insertion side of the insertion opening.

This known locking arrangement has the drawback that the metal clamp is complicated to manufacture, which results in undesirably high costs. A further drawback is that additional milling operations are required on the connection member in order to make a slot for receiving the clamp. It is also disadvantageous that a separate clamp, which is relatively small, can easily be lost or damaged.

The present invention aims to eliminate the abovementioned drawbacks and in particular to provide a locking arrangement which can be produced considerably more cheaply than the known locking arrangement. Furthermore, the present invention aims to provide a locking means which can be mounted and removed very simply, preferably manually without tools.

The present invention therefore provides a locking arrangement of the type mentioned in the preamble of claim 1, which is characterized in that the locking means comprise a ring, which is positioned around the connection member at the position of the insertion opening and is movable with respect to the connection member, the ring having a slot extending between its inside and its outside, which slot comprises a first slot part, through which the insertion part of the fluid line fits when the first slot part of the ring is aligned with respect to the insertion opening, and a second slot part, which is connected to the first slot part and is narrower than the first slot part, so that when the second slot part of the ring is aligned with respect to the insertion opening, part of the ring engages on the abutment surface of the insertion part which has been inserted into the insertion opening, as a result of which the insertion part is locked so that it cannot be pulled out.

Further advantageous embodiments of the invention are described in the claims and the following description, in which the invention will be explained in more detail with reference to exemplary embodiments of the locking arrangement of a fluid insertion connection according to the invention which are depicted in the appended drawing.

2

DETAILED DESCRIPTION OF THE INVENTION

Figure 1:
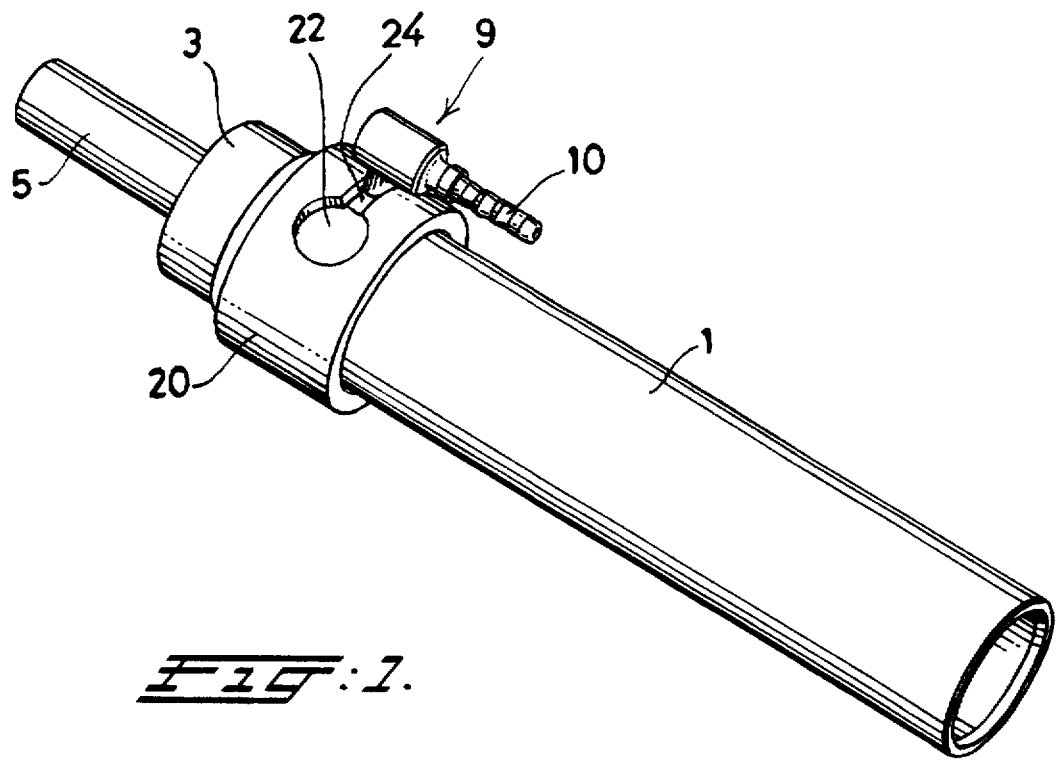
FIG. 1 shows a perspective view of a hydraulic cylinder having an insertable coupling component for a flexible hydraulic pipe, which is secured by a first embodiment of the locking means according to the invention.
Figure 2:
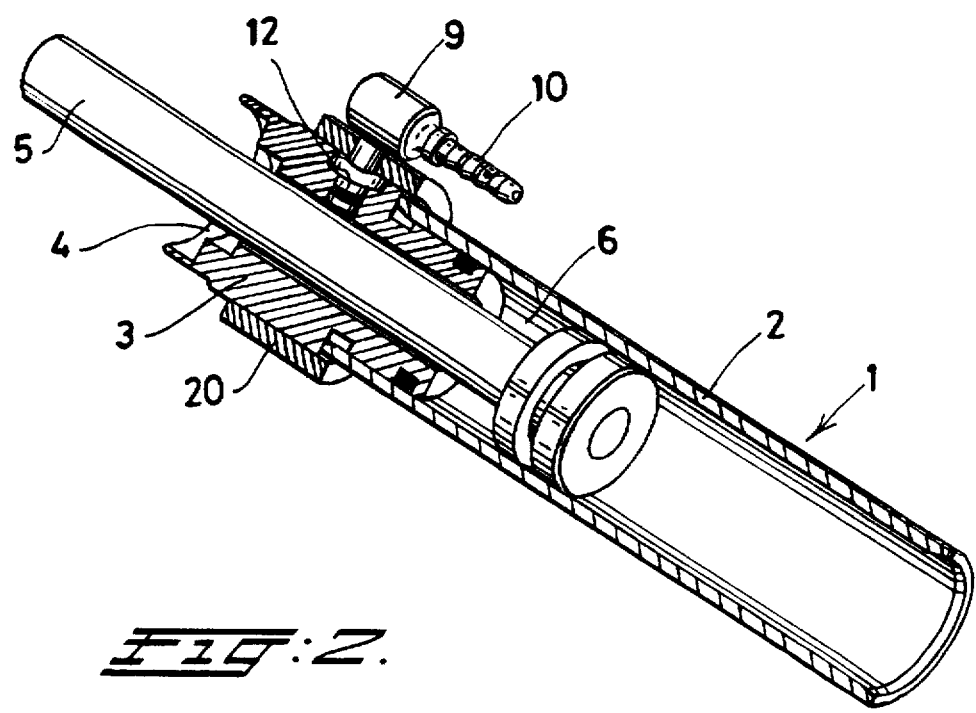
FIG. 2 shows the assembly of FIG. 1 in longitudinal section.

Part of a linear hydraulic cylinder 1, which comprises a metal cylinder tube 2 and a metal endpiece 3 which is mounted sealed in one end of this cylinder tube 2, is shown in FIGS. 1 and 2. Piston rod 5 of the cylinder 1 projects into the endpiece 3 through central axial bore 4. For the sake of simplicity of reproduction, the usual seals between the piston rod 5 and the endpiece 3 are omitted.

For the purpose of connecting the piston rod-side working chamber 6 of the cylinder 1 to a flexible hydraulic hose (not shown), an essentially cylindrical insertion opening 7 is formed in the endpiece 3. The insertion side of the insertion opening 7 lies on the outer circumference of the endpiece 3.

Figure 4:
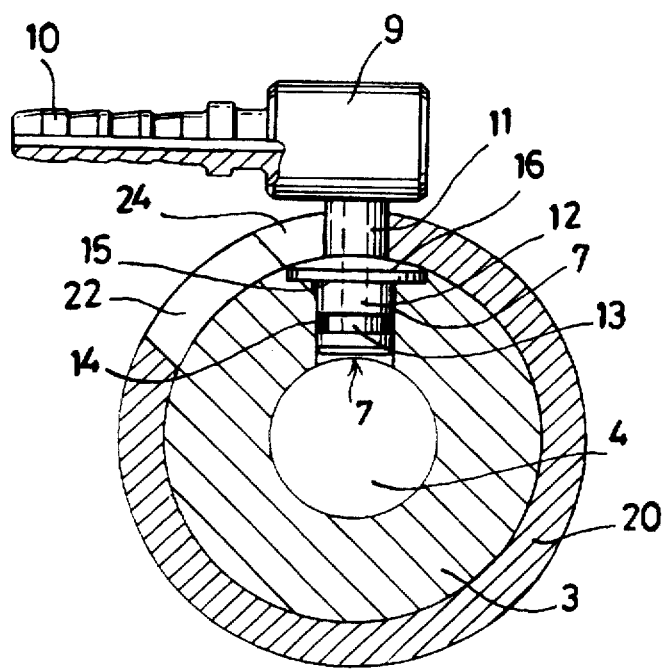
FIG. 4 shows the assembly of FIG. 1 in cross-section at the insertion opening.

For the purpose of connecting a flexible hydraulic hose, an elbow-shaped coupling component 9, which is depicted in detail in FIG. 4, is provided. The coupling component 9 has the flexible-hose receiving part 10 which is provided with ribs and grooves, is positioned at right angles and onto which a flexible hydraulic hose (not shown) can be pushed. At right angles to the part 10, the coupling component 9 has a cylindrical part 11, an insertion part 12 of which fits into the insertion opening 7 in the cylinder 1. In an embodiment of the coupling component which is not shown, the insertion part and the flexible-hose receiving part are in line with one another, i.e. in this case it is a "straight" coupling component.

In order to obtain a good seal between the cylinder 1 and the insertion part 12, a circumferential groove 13, in which a sealing ring 14 is located, is formed at a distance from the insertion end of the insertion part 12. Furthermore, the coupling component 9 has a laterally outwardly projecting thickened portion in the form of annular flange 15, which is positioned around the insertion part 12 and also extends outwards with respect thereto.

In order to receive the flange 15 of the coupling component 9 in a countersunk manner with respect to the circumferential surface of the endpiece 3, the insertion opening 7 on its insertion side forms a receiving cavity of corresponding dimensions for the flange 15.

The flange 15 of the coupling component 9, at its side which is remote from the insertion end of the insertion part 12, delimits an abutment surface 16, positioned around the insertion parts 12 in an annular manner, of the coupling component 9. In the embodiment depicted here, the abutment surface 16 is in the shape of an annular segment of a spherical surface, the radius of said spherical surface advantageously corresponding to the outer diameter of the endpiece 3 which is of cylindrical design at the location of the insertion opening 7.

Locking means are provided in order to secure the insertion part 12, which has been placed in the insertion opening 7 of the endpiece 3, of the coupling component 9 against being pulled out. These locking means preferably consist solely of a ring 20, which is positioned around the part of the endpiece 3 which is of cylindrical design at the location of the insertion opening 7. The ring 20 has an inner diameter which is such that the ring 20 positioned around the endpiece 3 can be moved manually, i.e. is displaceable in the longitudinal direction of the cylinder 1 and rotatable about the endpiece 3 of the cylinder 1.

Figure 3:
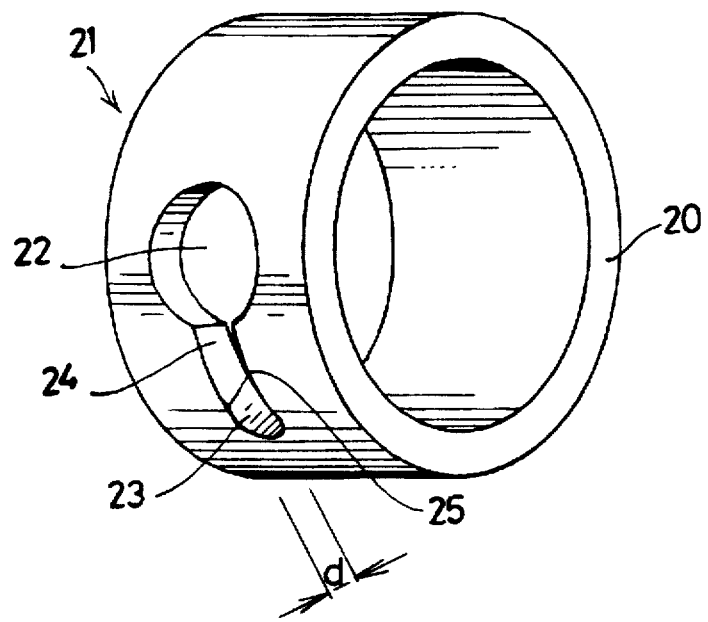
FIG. 3 shows a perspective view of the locking means of FIG. 1.

The design of the ring which is rotatable about the endpiece 3 is depicted in detail in FIG. 3.

The ring 20 is a single body which is preferably produced in the form of a (plastic) injection-moulded product. In a very advantageous embodiment, the ring 20 is injection-moulded from glass-fibre-reinforced plastic. A ring of this kind can be produced considerably more cheaply than the U-shaped locking clamps described in DE 38 17 472. Furthermore, the ring 20 can reliably accommodate the changing stresses which occur as a result of the continually altering pressure in the hydraulic system.

The ring 20 has a slot 21 which extends between its inside and its outside and comprises a first slot part 22, through which the insertion part 12 and the thickened portion 15 formed thereon of the coupling component 9 fit when the first slot part 22 of the ring 20 is aligned with the insertion opening 7 in the cylinder 1. In the exemplary embodiment shown in FIGS. 1, 2, 3 and 4, the slot part 22 forms an essentially circular opening in the ring 20. Furthermore, the slot 21 comprises a second slot part 23 which is connected to the first slot part 22 and is narrower than the first slot part 22, so that, when the second slot part 23 of the ring 20 is aligned with the insertion opening 7, part of the inside of the ring 20 engages on the abutment surface 16 of the insertion part 12 which has been placed in the insertion opening 7. As a result, the insertion part 12 is effectively locked so that it cannot be pulled out.

In the exemplary embodiment shown in FIGS. 1, 2, 3 and 4, the slot part 23 forms an essentially circular cutout having a diameter which is slightly larger than the diameter of the cylindrical portion of the coupling component 9 projecting through the slot part 22.

Figure 5:
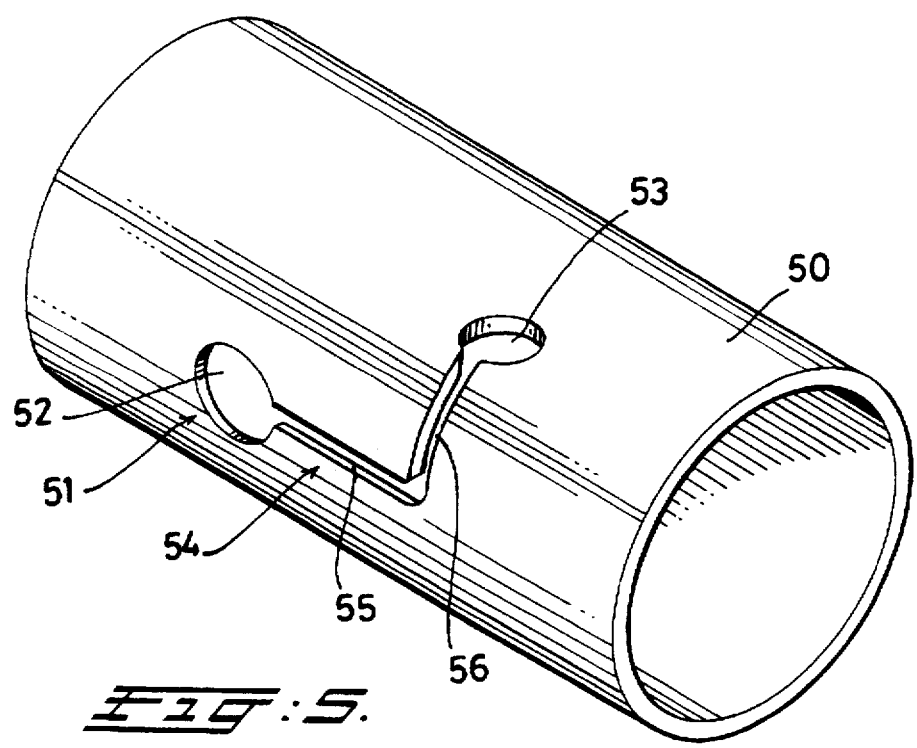
FIG. 5 shows a second embodiment of the locking means according to the invention.

The slot 21 in the ring 20 furthermore also comprises a third slot part 24, which connects the first slot part 22 and the second slot part 23 to one another. The third slot part 24 delimits at at least one location a narrow passage 25 having a dimension which is smaller than the corresponding dimension of the part of the coupling member 9 (dimension "d", cf. FIG. 3) which passes through the third slot part 24 when the ring 20 is moved. In practice, the narrow passage only has to be slightly narrower than the corresponding dimension of the part of the coupling component passing through it, for example 0.2 mm for a diameter of the cylindrical part 11 of approximately 4 mm, in order to provide the surmountable resistance. In this example, the third slot part 24 is an essentially straight channel with parallel boundary walls. In a variant embodiment (not shown), the third slot part can be a straight channel which is narrowed only locally. In FIG. 5, it can be seen that the third slot part can also be of bent design.

The ring 20 is designed such that the boundary walls of the narrow passage 25 can move apart in an essentially elastically resilient manner for the passage of the insertion part 12. In this example, this is advantageously realized by a suitable selection of the dimensions of the ring 20 and the stiffness of the material of the ring 20. In an embodiment which is not shown, the elastically resilient movability of the narrow passage of the third slot part could be obtained by designing the ring to be weaker near this narrowed section, for example by providing additional slots in the region of the narrowed portion or by providing a locally thinned section.

In order to receive the ring 20, the endpiece 3 of the cylinder 1 only has to be of cylindrical design at the location of the ring 20, which can be achieved simply and inexpensively.

The spherical design of the abutment surface 16 means that good securing is achieved in every position of the coupling component 9.

Preferably, the ring 20 is designed such that it is possible to rotate the ring 20 around the endpiece 3, for the purpose of securing or also unlocking the coupling component 9, manually without difficulties.

FIG. 5 shows a ring 50 which is suitable for the same purpose as the ring 20 in FIGS. 1 and 2. The ring 50 likewise has a slot 51 with a first slot part 52, a second slot part 53 and a third slot part 54 connecting these two slot parts 52, 53. The dimensions of the first slot part 52 make it possible for an insertion part of a line to be inserted in this slot part 52 in a corresponding insertion opening. The second slot part 53 has dimensions which are such that, when the insertion part of the line is inserted in the insertion opening and the second slot part 53 is aligned with respect to this insertion opening, the insertion part of the line is effectively prevented from being pulled out of the insertion opening.

The difference between the ring 50 and the above-described ring 20 is that the third slot part 54 here does not form a straight channel, as in the case of the ring 20, but is designed as a (sharp) bend. In the embodiment shown, the third slot part 54 comprises two sections, sections 55 and 56 respectively, which adjoin one another at an angle. As a result of the shape of the third slot part 54 differing from the straight channel shape, the ring 50 has to be moved in a specific manner in order to lock or unlock an insertion connection which is thus secured. The risk of the ring 50 being inadvertently unlocked is reduced compared to the ring 20. This risk can obviously be reduced further by providing the third slot part 54 with a narrowed portion, as described above, in this case too.

Figure 6:
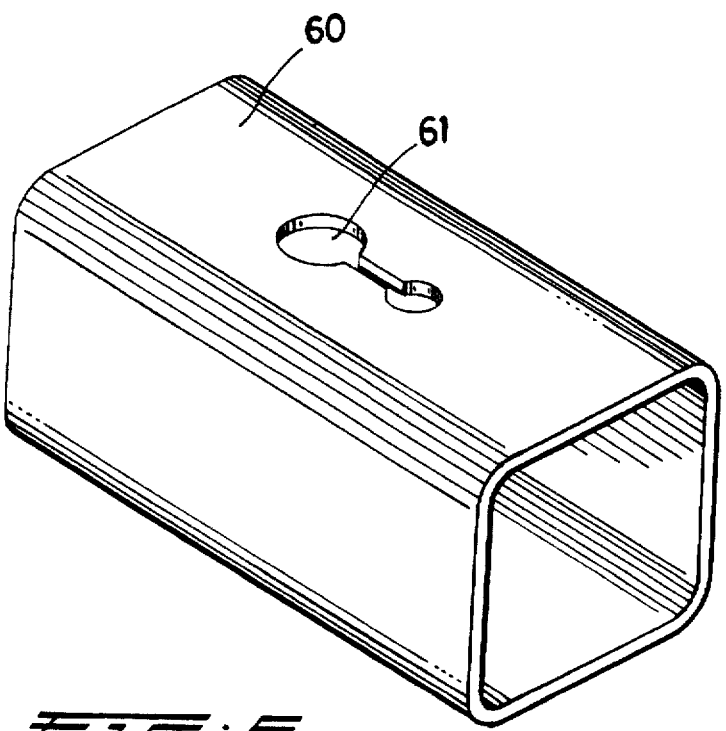
FIG. 6 shows a third embodiment of the locking means according to the invention.

FIG. 6 shows a ring 60 which differs from the ring 20 solely by the fact that the ring 60 is essentially rectangular and is intended to be positioned around a rectangularly designed part of a connection member. Owing to this rectangular shape, it is not possible to rotate the ring 60, for which reason the slot 61 extends in the axial direction of the ring 60.

What is claimed is:

1. A locking arrangement for a fluid insertion connection between a fluid line and a connection member, the fluid line having an insertion part at one end and the connection member being provided with an insertion opening which is open at a circumferential surface of the connection member and receives the insertion part of the fluid line, locking means being provided which engage on an abutment surface of the insertion part of the fluid line in order to prevent the insertion part of the fluid line from being pulled out of the insertion opening, characterized in that the locking means comprise a ring which is positioned around the connection member at the position of the insertion opening and is movable with respect to the connection member, the ring having a slot extending between its inside and its outside, which slot comprises a first slot part, through which the insertion part of the fluid line fits when the first slot part of the ring is aligned with respect to the insertion opening, and a second slot part which is connected to the first slot part and is narrower than the first slot part, so that when the second slot part of the ring is aligned with respect to the insertion opening, part of the ring engages on the abutment surface of the insertion part which has been inserted into the insertion opening, as a result of which the insertion part is locked so that it cannot be pulled out, and wherein the slot in the ring comprises a third slot part, which connects the first slot part and the second slot part to one another, the third slot part delimiting at at least one location a narrow passage which is smaller than the corresponding dimension of the part of the insertion part of the fluid line which passes through the third slot part when the ring is moved, and the boundary walls of this narrow passage being able to be moved apart resiliently for the passage of the insertion part.

2. A locking arrangement according to claim 1, the ring bing a single body.

3. A locking arrangement according to claim 2, the ring being made of glass-fibre-reinforced plastic.

4. A locking arrangement according to claim 1, the connection member having a cylindrical circumferential surface in the region of the ring and the ring being a cylindrical ring, the first slot part and the second slot part being situated at mutually different locations in the circumferential direction of the ring.

5. A locking arrangement according to claim 1, the connection member having, in the region of the ring, a circumferential surface which secures the ring against rotation with respect to the connection member, the first slot part and the second slot part being situated at the same location in the circumferential direction of the ring.

6. A locking arrangement according to claim 2, the third slot part comprising at least a first section and a second section, the first section and the second section of the third slot part being at an angle to one another.

7. A locking arrangement according to claim 1, the insertion part being of cylindrical design at its insertion end and being provided with a thickened portion, which projects laterally outwards with respect to the insertion part and one surface of which which faces away from the insertion end of the insertion part forms the abutment surface for the ring.

8. A locking arrangement according to claim 7, the insertion opening in the connection member comprising a part for receiving the thickened portion of the insertion part of the fluid line in a countersunk manner with respect to the circumferential surface of the connection member.

9. A locking arrangement according to claim 7 or 8, the abutment surface for the ring, which surface is delimited by the thickened portion, being an annular segment of a sphere whose diameter essentially corresponds to the diameter of the cylindrical circumferential surface of the connection member in the region of the ring.

10. A locking arrangement according to claim 1, the insertion part of the fluid line being provided with a circumferential groove and a sealing ring being disposed in said groove.

* * * * *